United States Patent [19]
Thakore

[11] Patent Number: 5,666,382
[45] Date of Patent: Sep. 9, 1997

[54] METHOD AND APPARATUS FOR COMMUNICATING IN THE PRESENCE OF POWER AND PROPULSION SYSTEM INTERFERENCE

[75] Inventor: Prashant B. Thakore, Pittsburgh, Pa.

[73] Assignee: ABB Daimler-Benz Transportation (North America) Inc., Pittsburgh, Pa.

[21] Appl. No.: 202,759

[22] Filed: Feb. 28, 1994

[51] Int. Cl.$^6$ .................................................. H04K 1/10
[52] U.S. Cl. ........................... 375/260; 375/261; 375/285; 375/296; 375/298; 375/349; 375/355; 370/483; 348/384
[58] Field of Search .................. 375/10, 39, 57, 375/58, 99, 41, 60, 244, 259–261, 285, 296, 321, 316, 324, 346, 348, 349, 351, 355; 364/726, 484, 604; 455/205; 370/19–21, 69.1, 70; 348/398, 607, 608

[56] References Cited

U.S. PATENT DOCUMENTS

| | | | |
|---|---|---|---|
| 3,720,816 | 3/1973 | Keller et al. | 364/576 |
| 4,270,206 | 5/1981 | Hughes | 375/223 |
| 4,438,511 | 3/1984 | Baran | 370/19 |
| 4,516,249 | 5/1985 | Cook et al. | 364/726 |
| 4,679,227 | 7/1987 | Hughes-Hartogs | 379/98 |
| 4,731,816 | 3/1988 | Hughes-Hartogs | 379/98 |
| 4,777,605 | 10/1988 | Pilkington | 364/726 |
| 4,833,706 | 5/1989 | Hughes-Hartogs | 379/98 |
| 5,295,138 | 3/1994 | Greenberg et al. | 370/57 |
| 5,367,539 | 11/1994 | Copley | 364/726 |
| 5,444,697 | 8/1995 | Leung et al. | 370/19 |

FOREIGN PATENT DOCUMENTS 9115925  10/1991  WIPO ................ H04N 7/08

OTHER PUBLICATIONS

F. Sing et al., "The UMTA Rail Transit EMI/EMC Program: An Overview and Summary," Feb. 1987, Final Report No. UMTA–MA–06–0153–4.

S.B. Weinstein, "Data Transmission by Frequency–Division Multiplexing Using the Discrete Fourier Transform," IEEE Transactions on Communications Technology, vol. COM–19, No. 5, pp. 628–634, Oct. 1971.

*Primary Examiner*—Stephen Chin
*Assistant Examiner*—Amanda T. Le
*Attorney, Agent, or Firm*—Webb Ziesenheim Bruening Logsdon Orkin & Hanson, P.C.

[57] ABSTRACT

A method and apparatus for communicating over a track circuit which includes an interference signal. The invention includes sampling the interference signal on the track circuit at a predetermined sampling frequency to produce a sampled interference signal, detecting interference at a predetermined first sub-carrier frequency based on a fast Fourier transform of the sampled interference signal, forming a vector signal corresponding to a predetermined second sub-carrier frequency related to the predetermined sampling frequency and different from the predetermined first sub-carrier frequency, performing an inverse fast Fourier transformation on the vector signal to form a series communication signal, coupling the series communication signal to the track circuit, sampling the series communication signal on the track circuit at the predetermined sampling frequency from a sampled communications signal, and recovering the vector signal based on a fast Fourier transform of the sampled communication signal.

23 Claims, 16 Drawing Sheets

$$D = \begin{bmatrix} 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 2+2i \\ 0 \\ 2-2i \\ 0 \\ -2+2i \\ 0 \\ -2-2i \\ 0 \\ 2+2i \\ 0 \\ 2-2i \end{bmatrix} \begin{bmatrix} 0 \\ -2+2i \\ 0 \\ -2-2i \\ 0 \\ 2+2i \\ 0 \\ 2-2i \\ 0 \\ -2+2i \\ 0 \\ -2-2i \\ 0 \\ 2+2i \\ 0 \\ 2-2i \\ 0 \\ -2+2i \\ 0 \\ -2-2i \\ 0 \\ 2+2i \\ 0 \\ 0 \\ 0 \\ 0 \\ 0 \\ 0 \\ 0 \\ 0 \\ 0 \\ 0 \\ 0 \end{bmatrix}$$

FIG. 8a $$S = \begin{bmatrix} 0.354 \\ 0.384 \\ -0.152 \\ -0.266 \\ -0.416 \\ 0.184 \\ 0.392 \\ 0.318 \\ -0.191 \\ -0.523 \\ -0.376 \\ 0.532 \\ 0.49 \\ 0.782 \\ -1.689 \\ -1.634 \\ 4 \\ -1.137 \\ -1.989 \\ 1.544 \\ -0.49 \\ 0.992 \\ -1.088 \\ 0.003 \\ 0.191 \\ 0.181 \\ 0.958 \\ -1.532 \\ 0.416 \\ -1.623 \\ 3.009 \\ 1.671 \\ -6.01 \\ 1.926 \end{bmatrix} \begin{bmatrix} 2.541 \\ -0.84 \\ -0.278 \\ -0.937 \\ 0.141 \\ 0.421 \\ 0.462 \\ 0.073 \\ -0.178 \\ -0.793 \\ 0.098 \\ -0.405 \\ 1.904 \\ 1.09 \\ 4.5 \\ 1.226 \\ 2.267 \\ -0.751 \\ 0.098 \\ -1.175 \\ 0.267 \\ 0.259 \\ 0.462 \\ 0.185 \\ -0.581 \\ -0.129 \\ -0.278 \\ 0.561 \\ 0.196 \\ 0.063 \\ -0.354 \\ -0.384 \\ 0.152 \\ 0.266 \end{bmatrix} \begin{bmatrix} 0.416 \\ -0.184 \\ -0.392 \\ -0.318 \\ 0.191 \\ 0.523 \\ 0.376 \\ -0.532 \\ 0.49 \\ -0.782 \\ 1.689 \\ 1.634 \\ -4 \\ 1.137 \\ 1.989 \\ -1.544 \\ 0.49 \\ -0.992 \\ 1.088 \\ -0.003 \\ -0.191 \\ -0.181 \\ -0.958 \\ 1.532 \\ -0.416 \\ 1.623 \\ -3.009 \\ -1.671 \\ 6.01 \\ -1.926 \\ -2.541 \\ 0.84 \\ 0.278 \\ 0.937 \end{bmatrix} \begin{bmatrix} 0.141 \\ -0.421 \\ -0.462 \\ -0.073 \\ 0.178 \\ 0.793 \\ -0.098 \\ 0.405 \\ -1.904 \\ -1.09 \\ 4.5 \\ -1.226 \\ -2.267 \\ 0.751 \\ -0.098 \\ 1.175 \\ -0.267 \\ -0.259 \\ -0.462 \\ -0.185 \\ 0.581 \\ 0.129 \\ 0.278 \\ -0.561 \\ -1.96 \\ -0.063 \end{bmatrix}$$

FIG. 9a

SIN =

| | | |
|---|---|---|
| 545.349 | 618.862 | 512.969 |
| 545.866 | 618.033 | 622.318 |
| 545.596 | 615.519 | 623.924 |
| 544.775 | 615.557 | 624.529 |
| 543.867 | 611.914 | 626.477 |
| 544.438 | 604.691 | 626.295 |
| 543.867 | 606.269 | 628.798 |
| 541.607 | 605.749 | 628.167 |
| 540.748 | 598.858 | 630.722 |
| 539.329 | 596.094 | 626.391 |
| 538.342 | 592.505 | 628.468 |
| 536.811 | 590.601 | 636.237 |
| 535.686 | 586.212 | 628.577 |
| 534.124 | 582.094 | 627.582 |
| 529.194 | 578.239 | 629.379 |
| 527.117 | 573.181 | 628.859 |
| 530.631 | 569.518 | 628.773 |
| 523.507 | 564.151 | 627.089 |
| 519.934 | 560.492 | 625.088 |
| 520.642 | 555.568 | 624.666 |
| 515.286 | 550.7 | 623.043 |
| 514.915 | 545.011 | 621.651 |
| 620.455 | 544.545 | 620.735 |
| 623.467 | 545.27 | 617.798 |
| 623.803 | 545.778 | 615.317 |
| 625.68 | 545.388 | 611.455 |
| 627.659 | 543.234 | 609.789 |
| 626.508 | 541.714 | 612.464 |
| 629.882 | 541.999 | 604.812 |
| 627.714 | 541.022 | 600.277 |
| 632.107 | 539.935 | 600.465 |
| 631.941 | 538.668 | 596.767 |
| 623.411 | 536.81 | 594.141 |
| 631.382 | 534.279 | 589.764 |
| 632.934 | 532.399 | 585.33 |
| 628.906 | 532.768 | 581.415 |
| 628.528 | 531.367 | 577.326 |
| 627.087 | 523.569 | 574.356 |
| 627.329 | 525.778 | 569.626 |
| 626.731 | 524.412 | 565.608 |
| 625.163 | 517.936 | 559.68 |
| 623.531 | 517.85 | 555.586 |
| 621.662 | | 550.516 |

METHOD AND APPARATUS FOR COMMUNICATING IN THE PRESENCE OF POWER AND PROPULSION SYSTEM INTERFERENCE

BACKGROUND OF THE INVENTION

1. Field of the Invention

The present invention relates to a method and apparatus for communicating between a transmitter and a receiver in the presence of harmonic interference. More particularly, the present invention relates to a method and apparatus for providing train-to-wayside communications in the presence of harmonic interference by detecting frequencies having harmonic interference and generating a communication signal having sub-carrier frequencies which are different from the detected frequencies of the harmonic interference.

2. Description of the Related Art

Audio frequency (AF) track circuits are used in mass transit systems for detecting the presence or absence of a train within a track circuit block, and for automatic train control by inductively coupling control signals from the track circuit block to a corresponding antenna on a moving train. For advanced automatic train control (ATC) systems, coupling control signals to a moving train requires as high a data rate as possible. Conventional modulation and demodulation techniques, such as rate coded modulation and binary FSK/PSK modulation, are presently used for inductive communications in mass transit systems. However, these modulation,techniques suffer from a relatively low data rate.

Further, AF communication systems used in train, mass transit and people mover systems must operate in the presence of interference. The two major sources of interference are caused by harmonics produced by power system components and by electric propulsion systems. Current switching by a power system generates harmonics having regular intervals in the audio frequency range. These harmonics have a relatively high energy content in the 4–10 kHz range because the switched current is on the order of hundreds of amperes in magnitude at the fundamental frequency of the power system.

Interference caused by power and propulsion systems and its affect on AF communication signaling performance has been considered in detail in publications such as F. Sing et al., "The UMTA Rail Transit EMI/EMC Program: An Overview and Summary," February 1987, Final Report No. UMTA-MA-06-0153-4; F. R. Holmstrom, "Conductive Interference in Rapid Transit Signaling Systems," Vol. 1–2, Final Reports UMTA-MA-06-0153- 85-5, -6, 1985–87; F. R. Holmstrom, "Inductive Interference in Rapid Transit Signaling Systems," Vol. 1–3, Final Reports UMTA-MA-06-0153-85-7, -8, and -9, 1986–87; and V. D. Nene, "Harmonic Characteristics of Rectifier Substations and Their Impact on Audio Frequency Track Circuits," Urban Mass Transportation Administration Report UMTA-MA-06-0025-81-6, 1982. For example, a power substation operating at 60 Hz using a six-pulse rectifier generates harmonic interference at frequencies which are multiples of 360 Hz (6×60 Hz), that is, at 360 Hz, 720 Hz, 1080 Hz, . . . , etc. Similarly, a 12-pulse rectifier operating at 60 Hz generates harmonic interference at frequencies which are multiples of 720 Hz (12×60 Hz). Further, harmonic interference generated by a propulsion system of a train occurs at multiples of the fundamental propulsion system frequency.

Interference generated by a power substation is coupled into AF track circuits through conductive paths and is, therefore, categorized as conductive interference. Interference from a train propulsion system is coupled in the track circuits inductively, and is categorized as inductive interference. FIGS. 1 and 2 show typical experimentally obtained spectra of conductive interference caused by a power substation and inductive interference caused by a chopper propulsion system of a train, respectively. It should be noted that the conductive interference caused by the power substation exists in the track circuit continuously, while the inductive interference caused by a train propulsion system occurs whenever the train is over a track circuit block.

Presently in train-to-wayside communication in mass transit systems, a plurality of independent channels are established in the audio frequency range for transferring specific information, such as vehicle identity (ID), a speed code, vehicle door control, etc. FIG. 3 shows an example of a portion of a frequency spectrum as used in the BART (Bay Area Rapid Transit) system in San Francisco.

Each independent channel in conventional systems has an independent antenna and AF receiver. In both rate coded modulation and FSK/PSK modulation techniques, and their respective variations, each individual AF receiver includes a fixed frequency bandpass filter coupled to an envelope detector. The filters, which are expensive, are used to separate communication signals of a particular communication channel from the harmonic interference and from other communication channels. Because of the difficulty associated with implementing sharp bandpass filters, the signals of each communication channel must use a bandwidth larger than the Nyquist minimum, thus resulting in an inefficient use of the AF spectrum.

Another limitation associated with the two presently used modulation techniques, which is related to the inefficient use of the AF spectrum, is an associated low data rate. As indicated by the typical interference spectra of FIGS. 1 and 2, consecutive harmonics of power and propulsion systems are located only a few hundred Hertz apart leaving only small "gaps" or "holes" in the AF spectrum for signaling. The conventional modulation techniques provide only a few independent channels within the available gaps between 0–10 kHz. Further, the bandwidths of these independent channels must be narrower than the gaps between the interference harmonics, thus leading to the low data rate for these independent channels.

Since presently available AF communications systems for train-to-wayside communications are not programmable, the previously mentioned fixed-frequency bandpass filters are specially designed to ensure proper selectivity for the individual channels. If an additional signal channel is required, the interference spectrum must be thoroughly investigated for selecting a carrier frequency free from interference. Expensive prototype development follows with testing for verifying that the additional channel is compatible with the associated power and propulsion systems. However, even after ensuring compatibility of the additional communication channel design with the power systems, power and propulsion system components may fail during normal operation, such as, a shorted or open diode in a substation rectifier assembly, or a shorted or open SCR in a chopper propulsion unit. In such an event, the characteristics and frequencies of the interference harmonics within the AF spectrum may change and adversely affect safety and overall reliability of the entire train system.

Most chopper propulsion systems with which the present modulation techniques are compatible use a fixed frequency pulse width modulation (PWM) technique for motor control.

In AC drive propulsion, which is becoming more popular in transit systems, the inverter frequency is varied for motor control, thus creating harmonic interference with a correspondingly varying spectrum.

Consequently, there is a need for an efficient modulation technique for train-to-wayside communications which provides a higher data rate in the presence of power system and propulsion system interference than that provided by conventional modulation techniques. Further, there is a need for a modulation technique for train-to-wayside communication techniques which adapts to varying interference conditions and is compatible with future propulsion systems.

SUMMARY OF THE INVENTION

The present invention solves the above-described problems by providing a method for communicating between a wayside and a vehicle over a track circuit when the track circuit includes an interference signal. The method according to the invention comprises the steps of sampling the interference signal on the track circuit at the wayside at a predetermined sampling frequency to produce a first sampled interference signal; detecting interference at at least one predetermined first sub-carrier frequency based on a fast Fourier transform of the first sampled interference signal such that the at least one predetermined first sub-carrier frequency is related to the predetermined sampling frequency; forming a first vector signal at the wayside corresponding to at least one predetermined second sub-carrier frequency such that the at least one predetermined second sub-carrier frequency is related to the predetermined sampling frequency and is different from the at least one predetermined first sub-carrier frequency; performing an inverse fast Fourier transformation on the first vector signal at the wayside to form a first time series communication signal; coupling the first time series communication signal from the wayside to the track circuit; sampling the first time series communication signal on the track circuit at the vehicle at the predetermined sampling frequency to form a first sampled communications signal; and recovering the first vector signal at the vehicle based on a fast Fourier transform of the first sampled communication signal. Normally, the interference signal includes a power system interference signal and a propulsion system interference signal, but the method according to the present invention is applicable to all types of inductive communication used in mass transit systems as well as inductive communication used in power line modems where harmonic interference also limits the data rate.

Preferably, the first vector signal can be formed by keying the at least one predetermined second sub-carrier frequency with a data signal using quadrature amplitude modulation or by using quadrature amplitude shift keying modulation. Additionally, coupling the first time series communication signal to the track circuit and sampling the first time series communication signal from the track circuit are synchronized in frequency and phase based on a fundamental frequency of the interference signal.

For duplex-type communications, the method according to the present invention includes the steps of forming a second vector signal at the vehicle corresponding to the at least one predetermined second sub-carrier frequency; performing an inverse fast Fourier transformation on the second vector signal to form a second series communication signal; coupling the second series communication signal from the vehicle to the track circuit; sampling the second series communication signal from the track circuit at the wayside at the predetermined sampling frequency to form a second sampled communications signal; and recovering the second vector signal at the wayside based on a fast Fourier transform of the second sampled communication signal.

For communications between a train and a wayside which is adaptive to varying interference conditions, the method according to the present invention additionally preferably includes the steps of sampling the interference signal on the track circuit at the vehicle at the predetermined sampling frequency to produce a second sampled interference signal; detecting interference at at least one predetermined third sub-carrier frequency based on a fast Fourier transform of the second sampled interference signal such that the at least one predetermined third sub-carrier frequency is related to the predetermined sampling frequency; forming a second vector signal at the vehicle corresponding to at least one predetermined fourth sub-carrier frequency such that the at least one predetermined fourth sub-carrier frequency is related to the predetermined sampling frequency and is different from the at least one predetermined third sub-carrier frequency; performing an inverse fast Fourier transformation on the second vector signal at the vehicle to form a second time series communication signal; coupling the second series communication signal from the vehicle to the track circuit; sampling the second time series communication signal from the track circuit at the wayside at the predetermined sampling frequency to form a second sampled communications signal; and recovering the second vector signal at the wayside based on a fast Fourier transform of the second sampled communication signal.

The present invention also provides a system for communicating between a wayside and a vehicle over a track circuit when the track circuit has an interference signal, comprising a transmitter and a receiver. The transmitter includes a first sensor coupled to the track circuit for sensing the interference signal and producing a sensed signal; a first sampling circuit, coupled to the first sensor, for sampling the sensed signal at a predetermined sampling frequency to produce a sampled interference signal; a first signal processor, coupled to the sampled interference signal, for detecting interference at at least one predetermined first sub-carrier frequency, wherein the at least one predetermined first sub-carrier frequency is related to the predetermined sampling frequency, the first signal processor further forming a first vector signal corresponding to at least one predetermined second sub-carrier frequency such that the at least one predetermined second sub-carrier frequency is related to the predetermined sampling frequency and is different from the at least one predetermined first sub-carrier frequency, and the first signal processor performing an inverse fast Fourier transformation on the first vector signal to form a first time series communication circuit which is coupled to the track circuit. The receiver comprises a second sensor coupled to the track circuit for receiving the first time series communication signal; a second sampling circuit, coupled to the received time series communication signal, for sampling the received time series communication signal at the predetermined sampling frequency to produce a sampled time series communication signal; and a second signal processor, coupled to the second sampling circuit, for performing an inverse fast Fourier transformation on the sampled time series communication signal for recovering the first vector signal.

Preferably, the first signal processor of the transmitter forms the first vector signal by keying the at least one predetermined second sub-carrier frequency with a data signal using quadrature amplitude modulation or using quadrature amplitude shift keying modulation.

The transmitter according to the present invention can also include a first synchronizing circuit coupled to the track circuit for synchronizing the coupling of the first time series communication signal to the track circuit based on a fundamental frequency of the interference signal. The receiver can include a second synchronizing circuit coupled to the track circuit for synchronizing the sampling of the first time series communication signal from the track circuit based on the fundamental frequency of the interference signal.

For duplex-type communications, the second signal processor preferably forms a second vector signal corresponding to the at least one predetermined second sub-carrier frequency, performs an inverse fast Fourier transformation on the second vector signal to form a second series communication signal, and couples the second time series communication signal to the track circuit, while the first sampling circuit samples the second communication signal from the track circuit at the predetermined sampling frequency to form a second sampled time series communications signal, and the first signal processor recovers the second vector signal by performing a fast Fourier transform of the second sampled time series communication signal.

For duplex-type communications which adapt to varying interference conditions, preferably the second sampling circuit of the receiver samples the interference signal on the track circuit at the predetermined sampling frequency to produce a second sampled interference signal, the second signal processor detects interference at at least one predetermined third sub-carrier frequency based on a fast Fourier transform of the second sampled interference signal such that the at least one predetermined third sub-carrier frequency is related to the predetermined sampling frequency, the second signal processor forms a second vector signal corresponding to at least one predetermined fourth sub-carrier frequency such that the at least one predetermined fourth sub-carrier frequency is related to the predetermined sampling frequency and is different from the at least one predetermined third sub-carrier frequency, the second signal processor performs an inverse fast Fourier transformation on the second vector signal to form a second time series communication signal, and couples the second time series communications signal from the vehicle to track circuit while the first sampling circuit samples the second time series communication signal from the track at the predetermined sampling frequency to form a second sampled communications signal, and the first signal processor recovers the second vector signal by performing on a fast Fourier transform of the second sampled communication signal.

Data transmission by multiple carrier frequencies using the fast Fourier transforms has been discussed in available literature as early as 1969. For example, see J. Salz and S. B. Weinstein, "Fourier Transform Communication System," presented at the Association of Computing Machinery Conference and Communication, Pine Mountain, Ga., October 1969, and S. B. Weinstein, "Data Transmission by Frequency-Division Multiplexing Using the Discrete Fourier Transform," IEEE Transactions on Communications Technology, Vol. COM-19, No. 5, pp. 628–634, October, 1971.

A full description of the FFT techniques utilized by the present invention are also described in a book by Rabiner, et al. entitled "Theory and Applications of Digital Signal Processing," Prentice Hall, Inc., N. J., 1975.

Specific applications of FFT-based modulation techniques as used with data modems over telephone channels are described in various U.S. Patents, such as U.S. Pat No. 4,438,511 to Baran, and U.S. Pat. Nos. 4,679,227, 4,731,816, and 4,833,706 all to Hughes-Hartog. However, the techniques disclosed by these patents are not applicable to train-to-wayside AF communications because interfering harmonics encountered in track signaling do not exist on telephone lines. Further, the bandwidth of a telephone channel has been universally standardized to 3 kHz, is dedicated to telephone communication only, and is typically free from interference, while the bandwidth for inductive AF communication in mass transit systems is chosen by a system designer who must optimize spectrum usage in presence of power and propulsion system interference. Further still, the transmission method in track signaling consists of inductively coupling a communication signal between a wayside track loop and a loop antenna on a vehicle. The resulting channel characteristics are entirely different from the channel characteristics of telephone channels. Additionally, the maximum signal levels allowed in telephone channels are regulated by regulatory agencies such as the Federal Communication Commission in U.S., while the noise levels encountered in telephone channels depend on various equipment used for transmission. In mass transit systems, maximum signal levels are not regulated and noise levels vary from application to application.

Thus, the present invention provides a modulation technique which achieves orthogonality between communication signals and power system and propulsion system interference without the need for expensive filters and while improving spectral usage efficiency. All the independent train-to-wayside data channels presently used can be integrated into a single transmitter/receiver unit employing standard hardware design and covering the entire frequency spectrum available for signalling, thus reducing the overall costs associated with train-to-wayside communications. Interference in a specific sub-channel can be detected in real time and use of the interfered-with sub-channel can be temporarily or permanently discontinued, depending on the communication system requirements. Thus, the present invention allows programmable as well as adaptive signaling for overcoming interference and compatibility problems.

BRIEF DESCRIPTION OF THE DRAWINGS

The various objects of the present invention, together with other advantages and benefits which may be attained by its use, will become more apparent in view of the following detailed description of the invention taken in conjunction with the drawings. In the drawings, wherein like reference numerals identify corresponding portions of the various embodiments of the present invention:

FIGS. 8A and 8B show an example of an FFT vector D according to the present invention and the corresponding spectrum of vector D, respectively;

FIGS. 9A and 9B show a time series vector corresponding to vector D of FIG. 8A and the corresponding time-domain representation of vector S, respectively;

FIGS. 10A and 10B show a received vector SNI corresponding to vector S of FIG. 9A and the corresponding time-domain representation of vector SNI, respectively;

FIG. 11 shows a demodulated vector R corresponding to vector SNI of FIG. 10A according to the present invention;

DETAILED DESCRIPTION OF THE PREFERRED EMBODIMENTS

The signaling approach of this invention estimates the power and propulsion system interference a priori, either on-line or off-line, and produces a signal overcoming the interference. The modulation technique according to the present invention is applicable to all types of inductive communication used in mass transit systems, as well as inductive communications used in power line modems where harmonic interference also limits the data rate.

It is well known that a fast Fourier transform (FFT) vector can be used to digitally represent a frequency-domain signal. If the inverse fast Fourier transform (IFFT) of the FFT vector is performed, a digital time-domain representation of the selected signal is obtained. If the original FFT vector includes signals at several frequencies, then the IFFT of the vector provides an equivalent time-domain representation of the signals at the several frequencies.

According to the present invention, a transmitter generates a multi-carrier signal within a 0–10 kHz spectrum using a 2N-point FFT. Pairs of FFT points represent potential sub-carrier frequencies, or sub-channels, for transmitting information. As previously discussed, some potential sub-carrier frequencies associated with a train-wayside AF communication system spectrum are completely corrupted by interference and, consequently, cannot be used. At the remaining usable sub-carrier frequencies, a communication signal, generated by quadrature amplitude shift keying (QASK) or quadrature amplitude modulation (QAM), is formed into an FFT vector. The inverse (IFFT) of the FFT vector is performed to obtain a digital time-domain representation of the FFT vector, or a time series signal, which is then passed through a digital-to-analog converter (DAC) for continuous wave (CW) transmission via the track circuit block.

The demodulation process at the receiver is the inverse of the modulation process. The received CW signal is sampled using an analog-to-digital converter (ADC) and an FFT of the sampled CW signal is performed for demodulating the communication signal FFT vector. Preferably, the DAC and ADC sampling clocks are synchronized to harmonics of the interference for ensuring orthogonality between the communication signal and the interference, and for providing automatic system adaption to periodic slowly varying interference.

Figure 4:
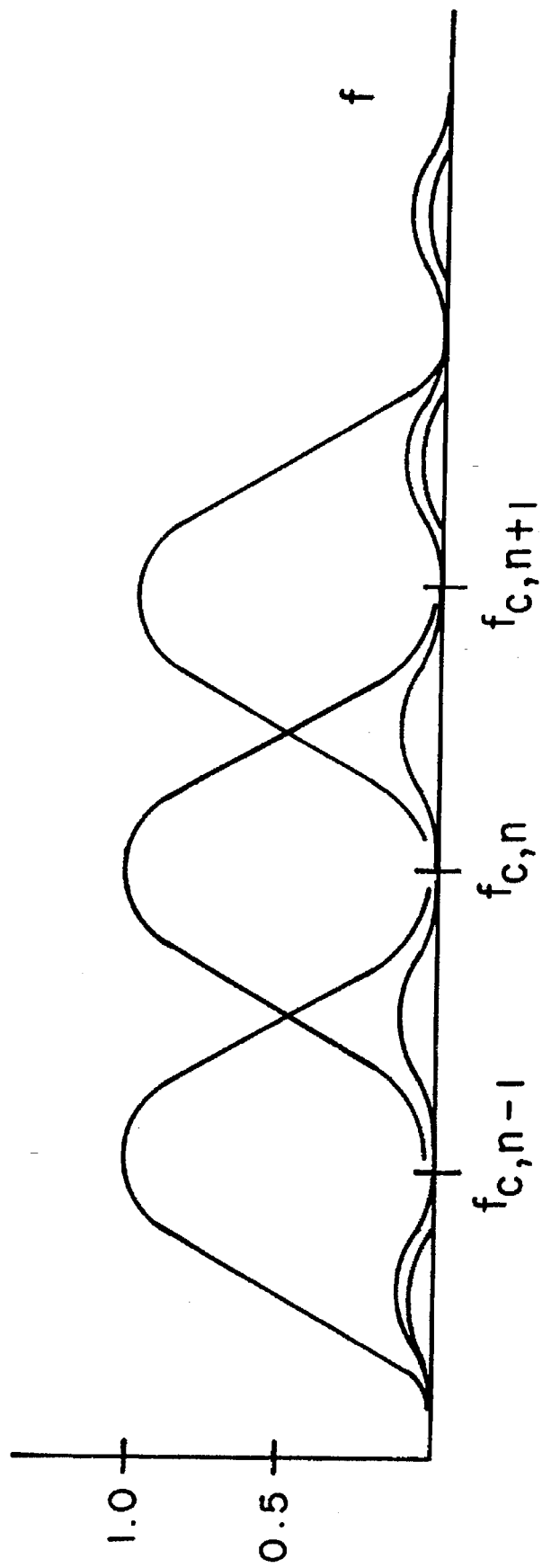
FIG. 4 shows examples of sinc function-type signals as used by the present invention.

According to the present invention, the sub-carrier frequencies are keyed by data using QASK or QAM signal representation. Therefore, the spectra at the individual sub-carrier frequencies are not band-limited, as is the case of the presently used modulation techniques, but are sinc functions as shown in FIG. 4. These sinc function-type signals are separated in the receiver by baseband processing, not by bandpass filtering. This approach achieves higher spectral usage efficiency than conventional techniques and offers several implementation advantages. Alternatively, modulation of the communication signal according to the present invention could be achieved by direct multiplication of the x and y coordinate values of QAM signals with the subcarrier frequencies. Additionally, the FFT modulation according to the invention can be first performed in the 0–6 kHz bandwidth, and then moved to the 4–10 kHz frequency range by using well-known heterodyning techniques.

The FFT-based modulation technique according to the invention is illustrated in detail in the following example. Several parameters associated with the technique are arbitrarily chosen in this example. As will be discussed in greater detail, selection of these parameters affect the spectrum usage efficiency and the data rate of the invention.

In order to explain the signaling technique according to the invention, the interference is first considered in greater detail. In this example, only the conductive interference will be considered. However, inductive interference is addressed in the same manner. Of course, the basic technique of the present invention can be extended to optimize signaling efficiency in the presence of any type of interference.

Figure 5:
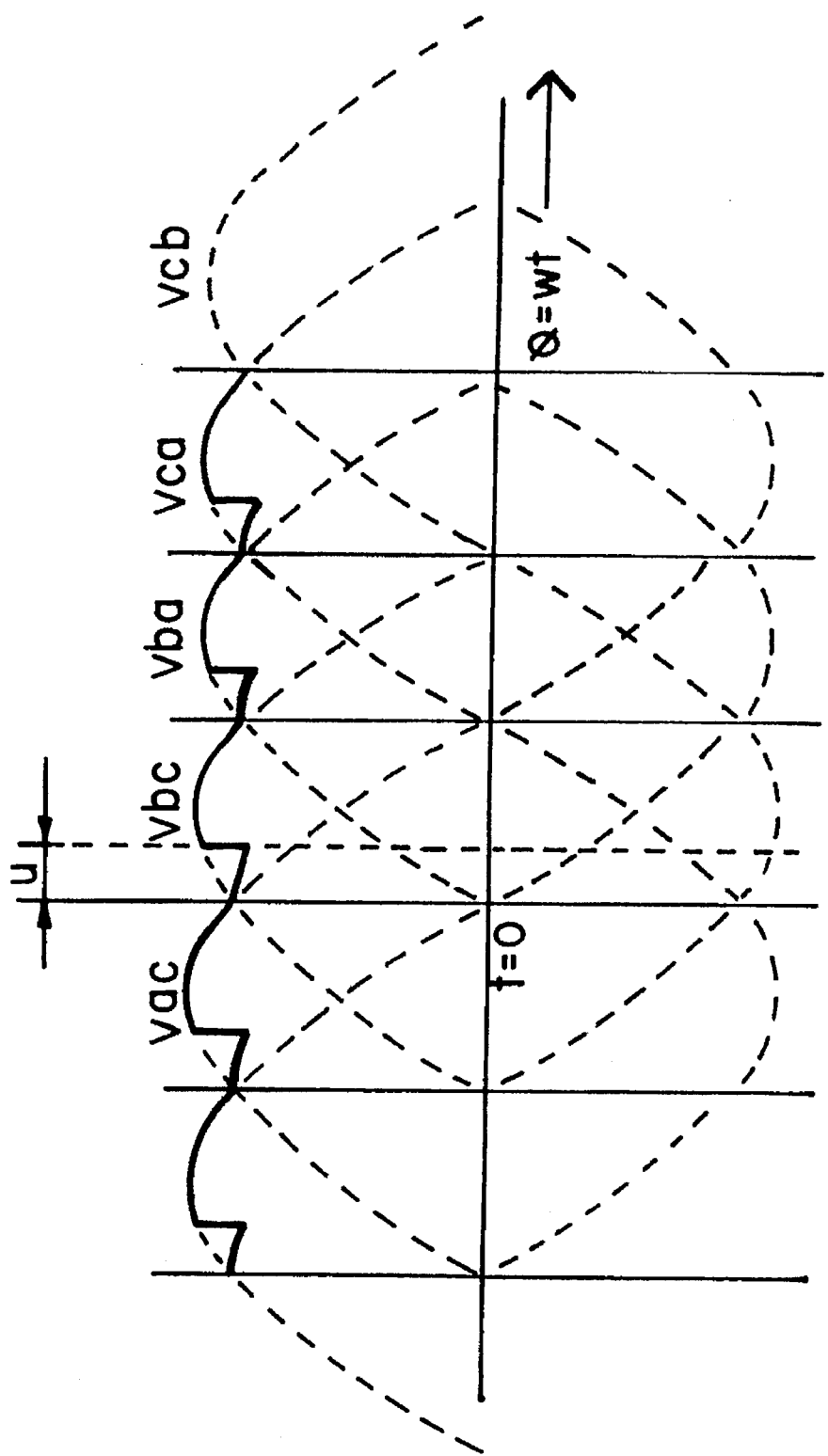
FIG. 5 shows a typical output waveform of a three-phase (six-pulse) power substation rectifier.

FIG. 5 shows a typical output waveform of a three-phase (also known as a six-purse) substation rectifier. FIG. 5 shows that the rectifier output waveform is not a constant DC level, but contains six ripples during one complete power frequency cycle. The ripples produce a series of harmonics at multiples of the power line frequency. In particular, the waveform in FIG. 5 is an aggregate of two independent waveforms and can be mathematically represented as $$V_d = \begin{cases} \left(\dfrac{\sqrt{3}}{2}\right) V\cos\theta & 0 \leq \theta \leq u \\ V\sin\left(\theta + \dfrac{\pi}{3}\right) & u \leq \theta \leq \dfrac{\pi}{3} \end{cases} \quad (1)$$

where, u is the commutation angle, that is, the delay of transferring the load from one diode to the next diode, and V is the peak input voltage.

To determine harmonic content in the range from 0–11, 340 Hz, a fast fourier transform of the rectifier waveform of FIG. 5 is performed. To do this, the rectifier waveform is sampled at a frequency of 23,040 Hz, that is, at a frequency which is greater than twice 11340 Hz. In this example, a 64 point FFT is chosen. This requires 128 samples of the rectifier waveform at the sampling frequency. Selection of a 64 point FFT allows the frequency range of 0 to 11,520 Hz to be divided into 64 sub-channels with center frequencies placed at 0, 180 Hz, 360 Hz, 560 Hz, . . . , 11340 Hz. (The frequency at 0 is only used for mathematical computation.) Selection of an FFT having a different number of points would change the frequency resolution and the required number of samples of the rectifier waveform accordingly.

Figure 1A:
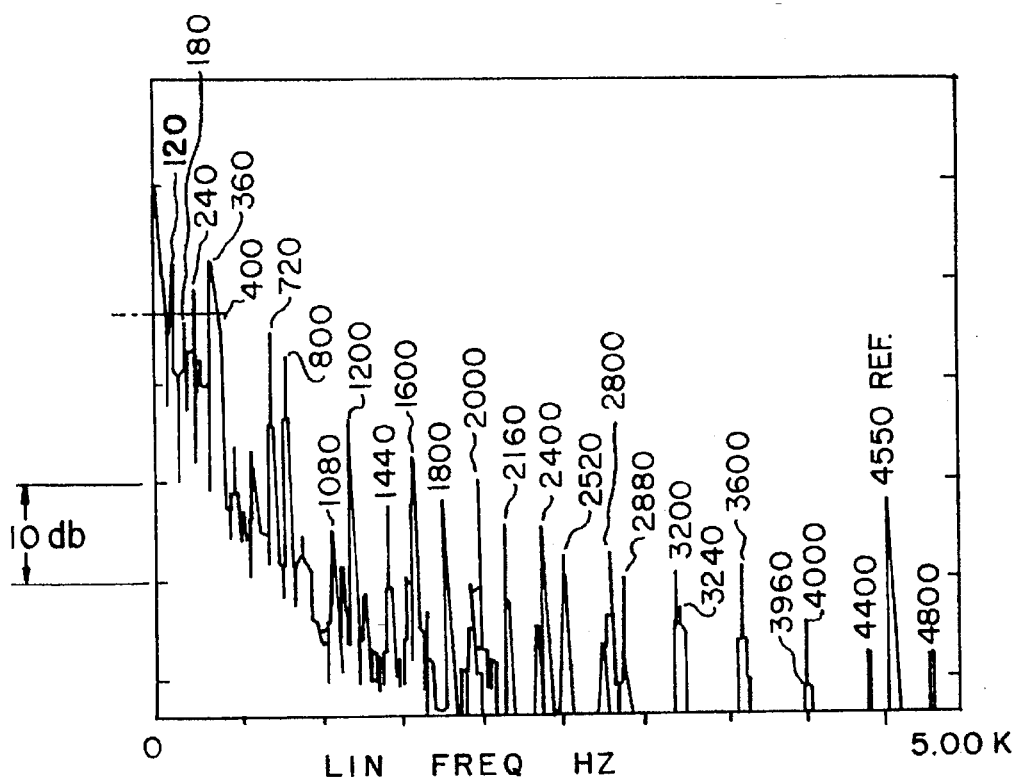
FIGS. 1A and 1B show experimentally obtained spectra of conductive interference caused by a power system for 0–5 kHz and 0–10 kHz bandwidths, respectively.
Figure 1B:
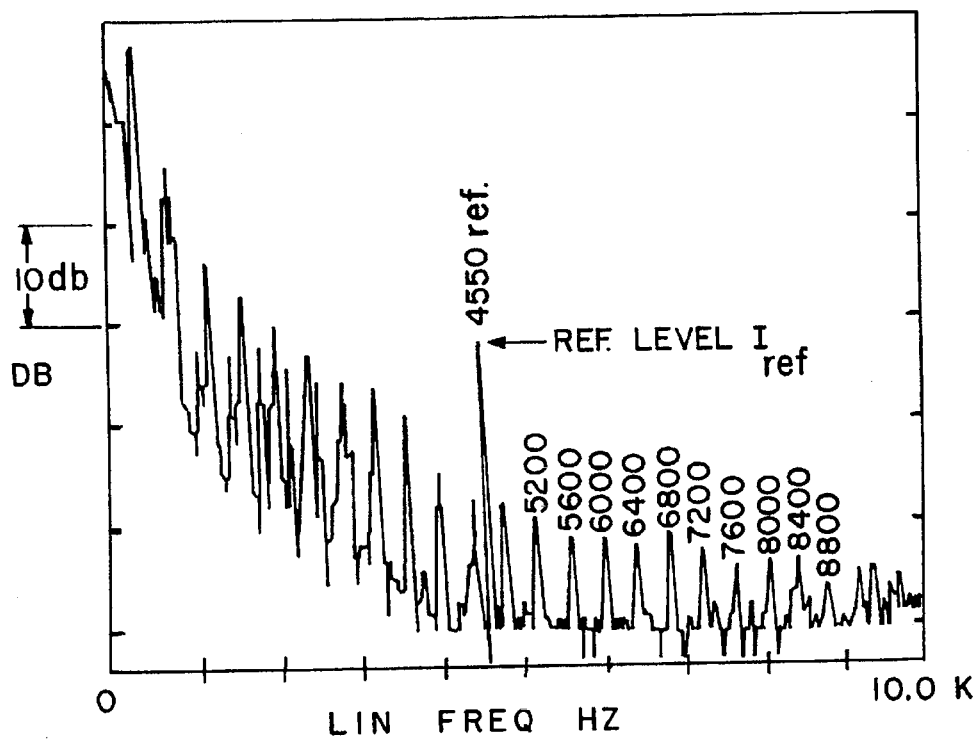
Figure 2:
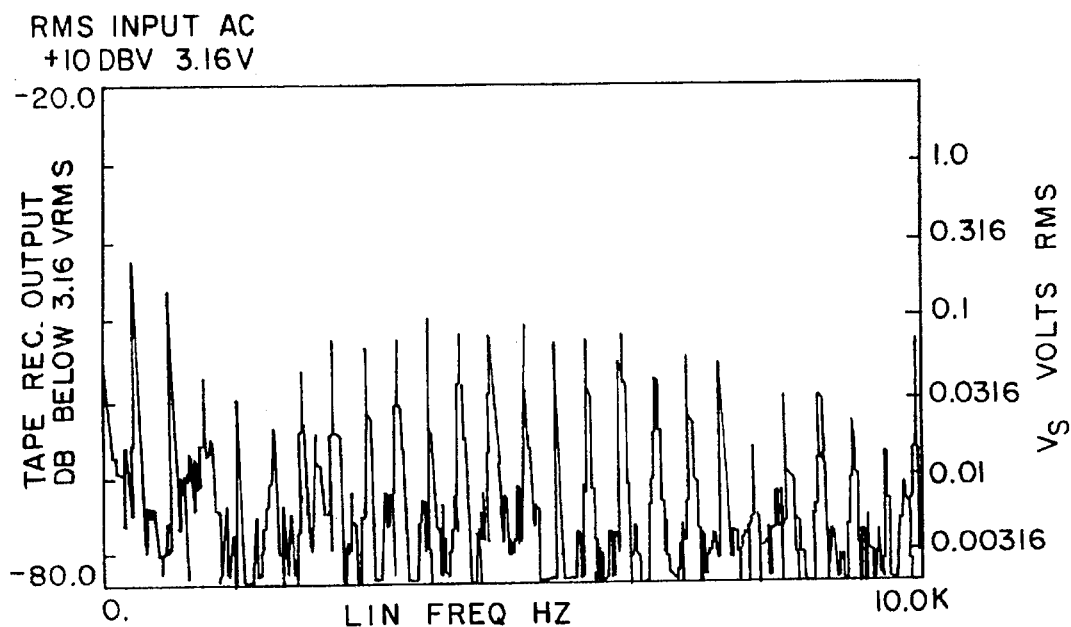
FIG. 2 shows a typical experimentally obtained spectrum of inductive interference caused by a chopper propulsion system of a train.
Figure 3:
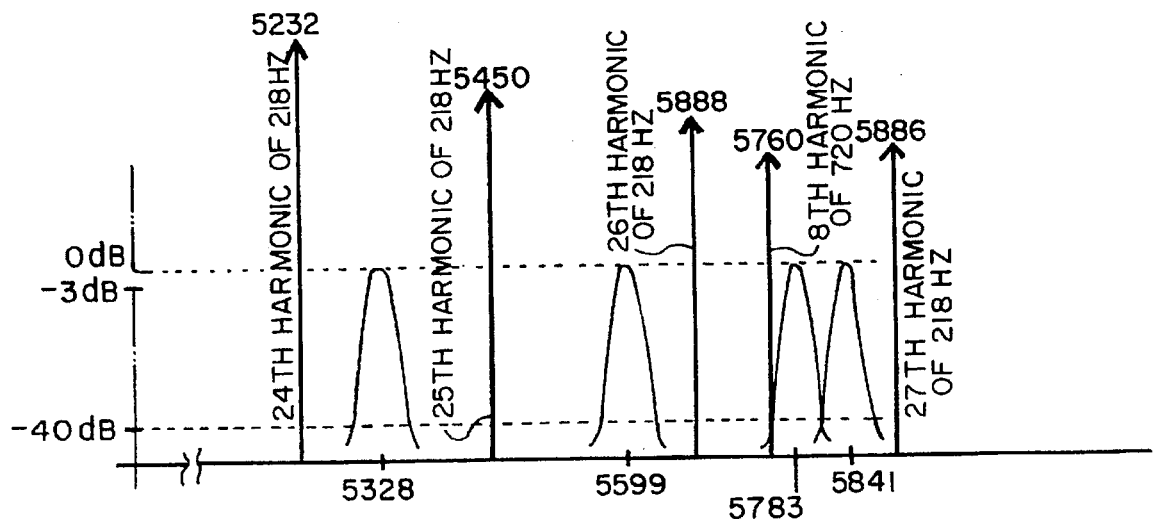
FIG. 3 shows an example of a portion of an audio frequency spectrum as used in the prior art communication system in the Bay Area Rapid Transit System (BART) in San Francisco.
Figure 6A:
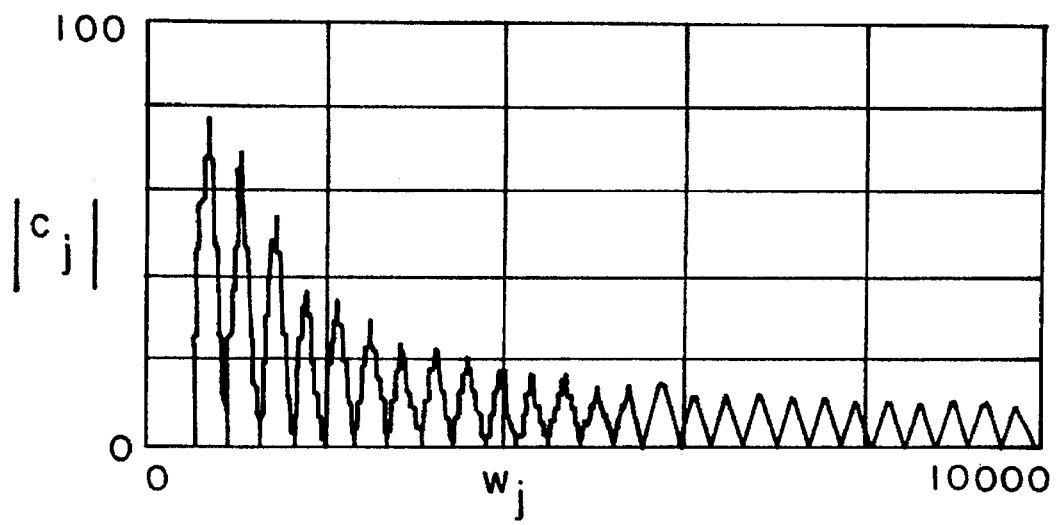
FIGS. 6A and 6B show a magnitude and a phase plot, respectively, of a 64 point FFT of the rectifier waveform of FIG. 5.
Figure 6B:
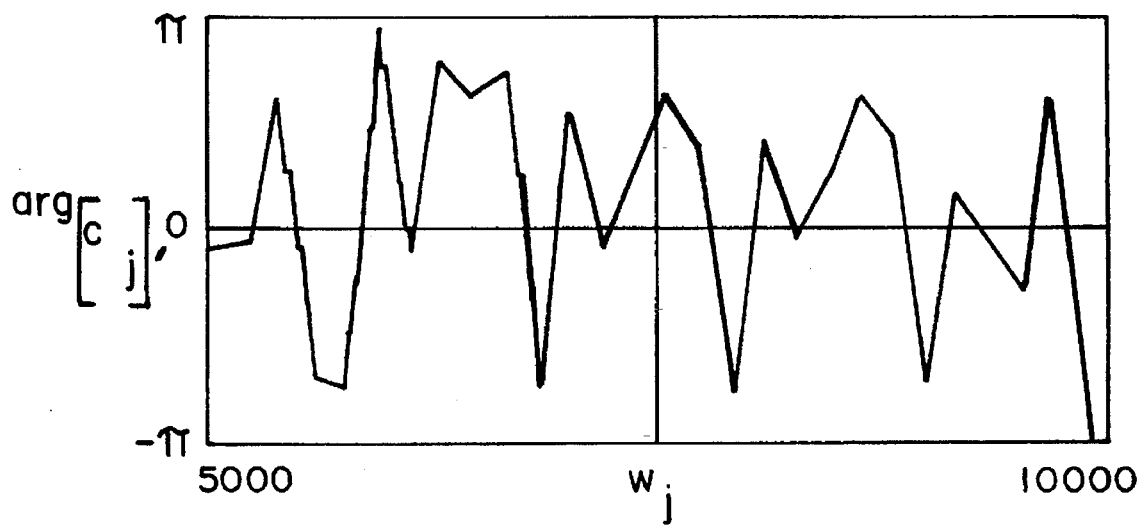

FIGS. 6A and 6B show a magnitude and phase plot of a 64 point FFT, respectively, of the rectifier waveform of FIG. 5. Note that even with a 64-point FFT, the magnitude plot resembles the experimental spectral plot of FIG. 1, which was generated from an FFT having considerably more points. FIGS. 1 and 6A show harmonics at 360 Hz, 720 Hz, . . . , etc.

To produce a communication signal according to the present invention, a 64 point FFT is chosen, for example, and the frequency range of 0–11,520 Hz is again divided into 64 sub-channels, each 180 Hz wide with center frequencies placed at 0 Hz, 180 Hz, 360 Hz, 560 Hz, . . . , 11340 Hz. Each of these center frequencies represent a potential sub-carrier for the communication signal. As before when performing the FFT of the rectifier waveform, selection of a 64 point FFT is a design choice. The spectrum usage efficiency can be improved if the number of sub-channels is increased within a limit, as will be discussed below.

Expecting a high level of white noise below 4 KHz, the 22 sub-carriers below 4 kHz are not chosen for the communication signal. The sub-carrier frequencies above 10 frequencies above 10 kHz are also avoided. Thus, there are 33 sub-carrier frequencies remaining in the frequency range between 4–10 kHz which can be used for the communication signal.

As previously shown, the power station harmonics are assumed to be located at multiples of 360 Hz. In the frequency range of 4–10 kHz, these harmonics are at frequencies 4320, 4680, . . . , 9720 Hz. Thus, these sub-carrier frequencies are not usable for communicating through the track circuit block. Out of the available 34 sub-carrier frequencies in 4–10 kHz range, there now remain 17 sub-carrier frequencies having mid points between consecutive interference harmonics. These sub-carrier frequencies are located at 4140 Hz, 4500 Hz, . . . , 9900 Hz and completely avoid harmonic interference generated by the substation. So, in this 64 point FFT example, the odd number FFT sub-carriers starting with FFT element 23 are chosen for AF track signaling, while the even numbered FFT sub-carriers are not chosen because they include the interfering harmonics.

Depending on the signal-to-noise (S/N) ratio of a particular AF communication system, lower or higher bit constellations may be used, such as 1-bit, 3-bit, 4-bit, 5-bit or 6-bit per sub-carrier frequency. When high S/N ratios are available, higher bit constellations can be used. For each sub-carrier frequency chosen in this example, QAM signals in 2-bit constellations with the following convention are used:

2+2i represents 00
2−2i represents 11
−2+2i represents 10
−2−2i represents 01

Figure 7A:
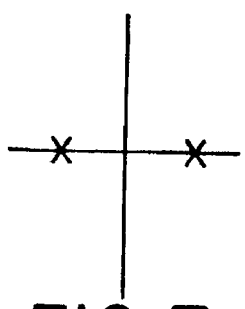
FIGS. 7A–7F, respectively, show examples of 1-bit, 2-bit, 3-bit, 4-bit, 5-bit and 6-bit constellation of QAM signals.
Figure 7B:
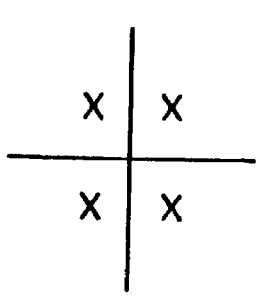
Figure 7C:
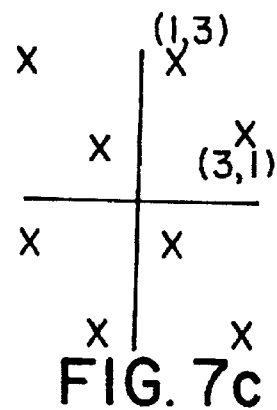
Figure 7D:
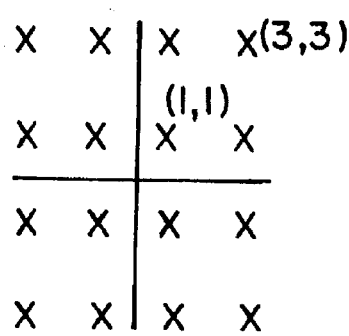
Figure 7E:
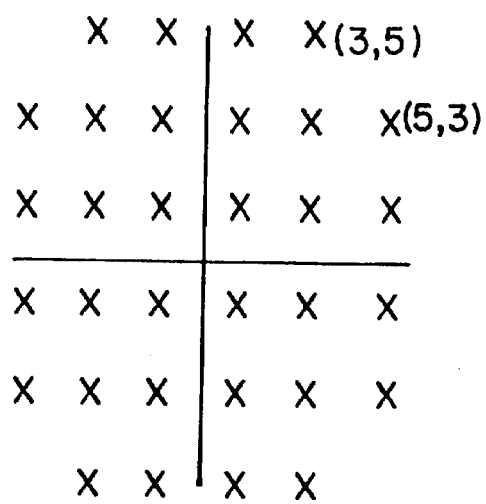
Figure 7F:
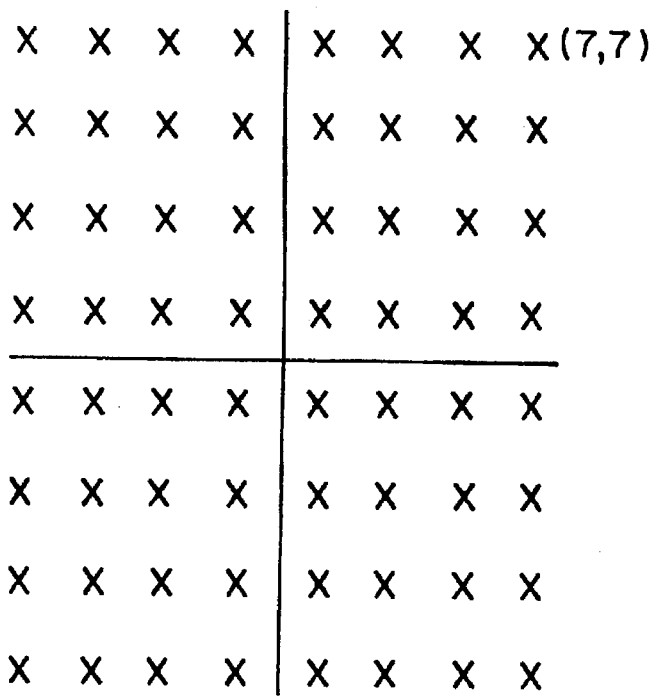

The 2-bit constellation per sub-carrier signal used in this example is shown in FIG. 7B, along with other possible constellations in FIGS. 7A and 7C–7F. With the selected 2-bit constellation convention, each sub-carrier frequency is capable of transmitting two bits of information during every epoch. According to the present invention, an epoch is defined as a period of time during which a transmitter sends all the 2N samples of a time series signal for all the sub-carrier frequencies in the communication signal, or ensemble. The duration of each epoch is theoretically required to be equal to $1/\Delta f$, where $\Delta f$ is the frequency separation of the sub-carriers. In this example, $\Delta f$ is equal to 180 Hz. In order to minimize intersymbol interference (ISI) and interchannel interference (ICI), an epoch duration is made slightly greater than $1/\Delta f$ to include a guard period. That is, $T_{epoch}=1/\Delta f+T_g$, where $T_g$ is the guard period. The guard period is used to retransmit the first few samples of the 2N sample time series signal.

In this example, $1/\Delta f$ equals 5.55 ms and $T_{epoch}$ is chosen to equal 6.25 ms. The first 16 samples of the 128 sample signal are also chosen to be retransmitted during the guard period. So, with 17 usable sub-carrier frequencies, the system can transmit 34 bits per epoch or 5,440 bits per second.

Consider the following string of 34 bits as data to be transmitted during a particular epoch:

00 11 10 01 00 11 10 01 00 11 10 01 00 11 10 01 00

Figure 8B:
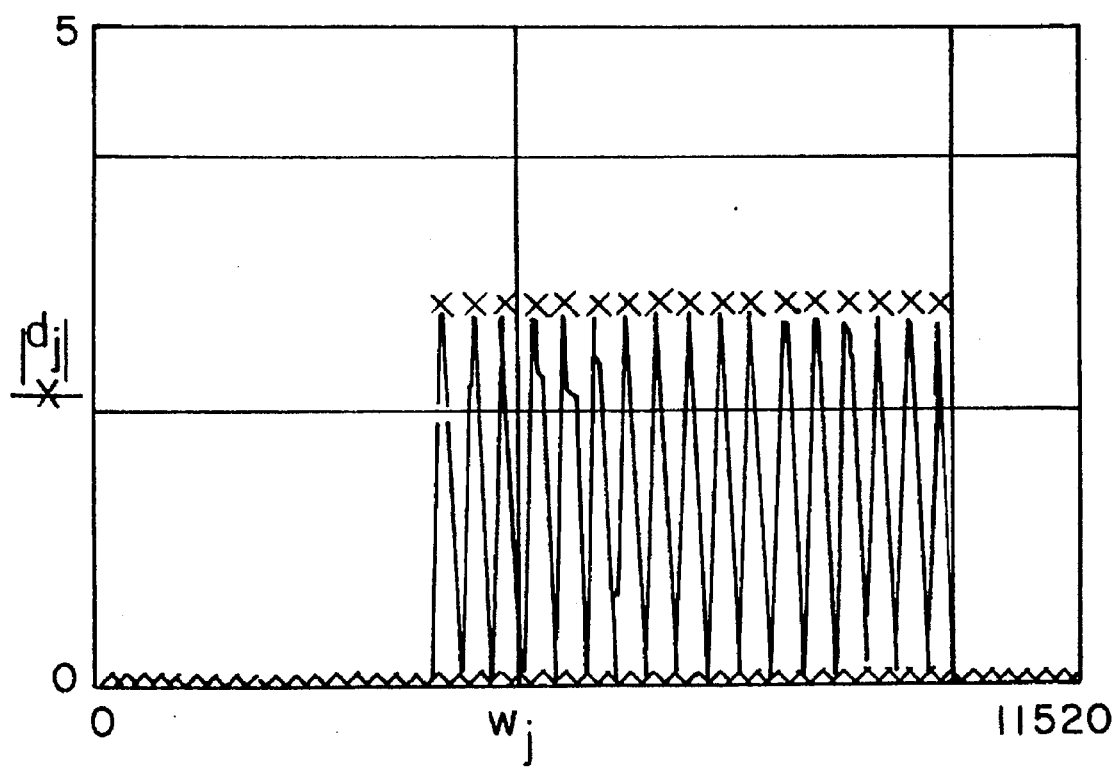
Figure 9B:
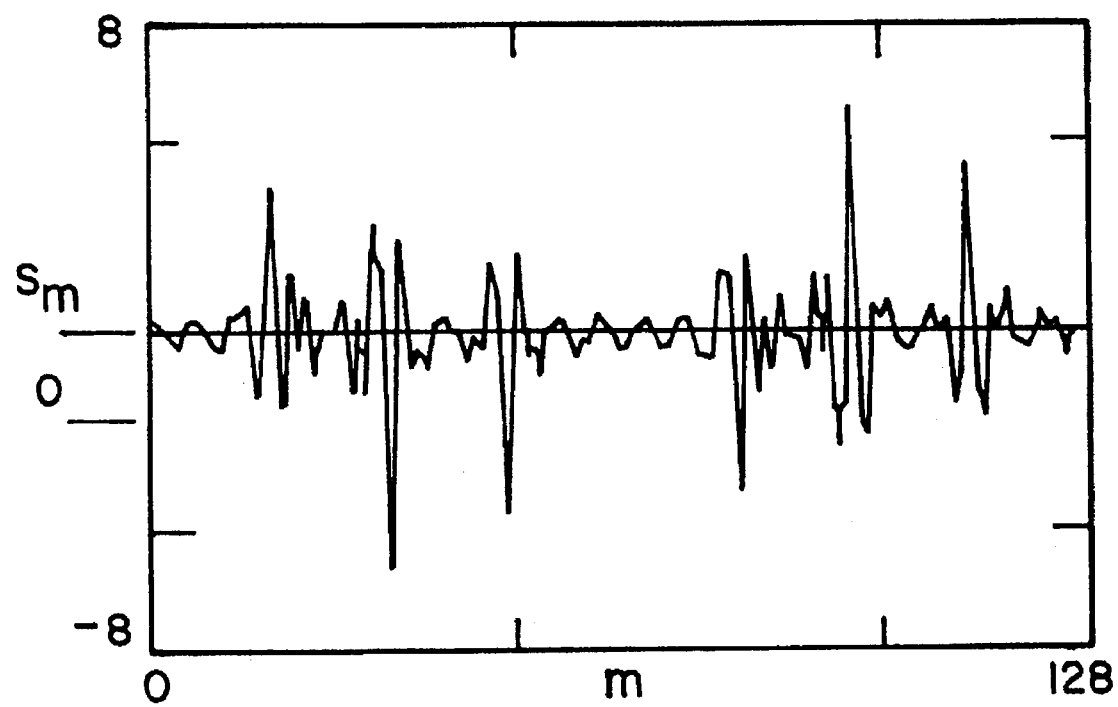

Then, an unaugmented FFT signal vector D, derived by the above described QAM signaling convention for this bit stream is shown in FIG. 8A. The spectrum of vector D is shown in FIG. 8B. Even number elements are set to zero because substation interference exists at these sub-carrier frequencies. Odd number elements less than element 23 are set to zero because the magnitude of white noise is expected to be large. Odd number elements greater than element 55 are set to zero because they are above 10 kHz. The odd number elements between elements 23 and 55 inclusive are each set to the QAM representation of the bit stream. Each element of this vector is a QAM coordinate representing a pair of bits according to the 2-bit constellation convention. FFT signal vector D is then augmented with its complex conjugate, yielding a vector of 128 real-valued elements. The inverse FFT (IFFT) of this 128-point augmented vector creates a time series vector s representing the 34-bit communication signal. Vector s for the example bit stream is shown in FIG. 9A. Note that the FFT points in vector D are complex numbers, but the resulting IFFT points in vector s are real numbers. The elements of time series vector s are then passed through an ADC to create a CW signal, shown in FIG. 9B, for transmission through the inductive channel.

In the inductive transmission channel two other components, interference and additive white gaussian noise (AWGN), are added to the communication signal. Thus, the received signal vector r(t) is $$r(t)=s(t)+i(t)+n(t) \quad (2)$$

where, i(t) is an interference vector and n(t) is an AWGN vector. The interference vector i(t) is the same interference vector of substation harmonics considered at the beginning of this example. The components of AWGN vector n(t) are derived experimentally or by simulation.

Figure 10B:
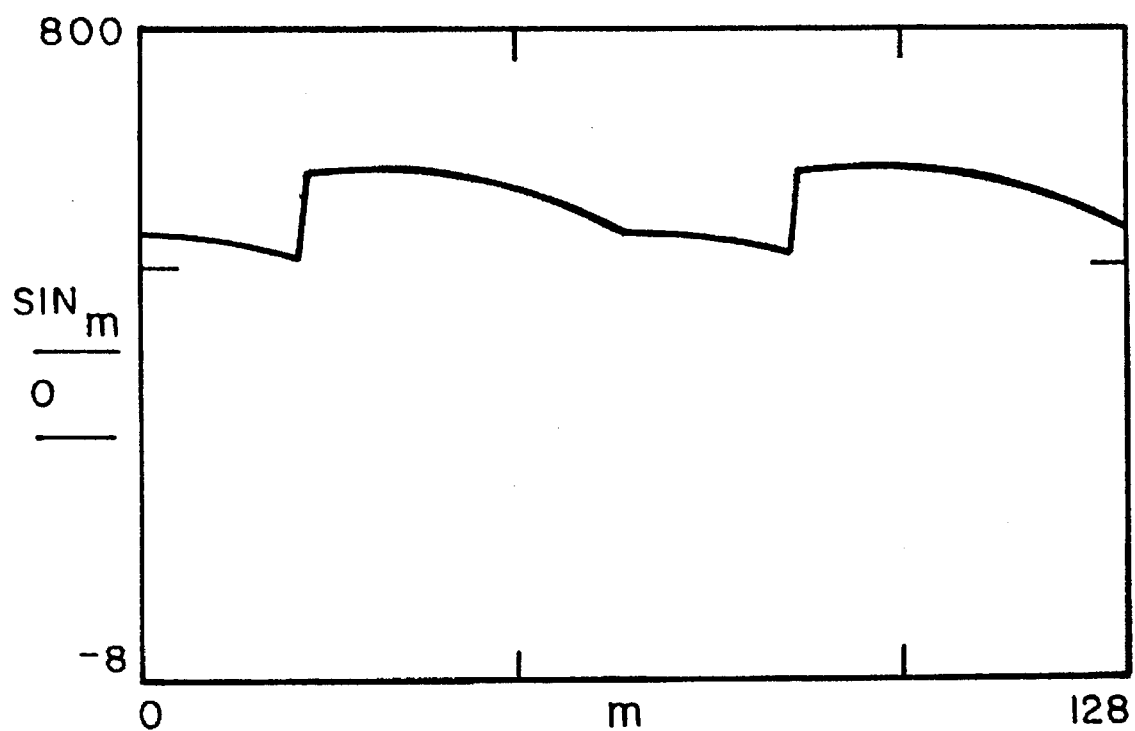

Vector r(t) is identified as vector SNI (signal+ noise + interference) in FIG. 10A, along with its corresponding time plot in FIG. 10B. It is interesting to note that in vector SNI, the amplitude of the interference component is several times greater than the amplitude of either the communication signal or the noise. Hence, the shape of the time plot of SNI resembles the rectifier waveform of FIG. 5.

At the receiver, the time series vector s is reconstructed by sampling the CW signal waveform. Demodulation, according to the present invention, performs a fast Fourier transformation on the received vector SNI for extracting the communication signal as follows:

$$R=FFT[r(n\Delta t)] \quad (3)$$

Figure 11:
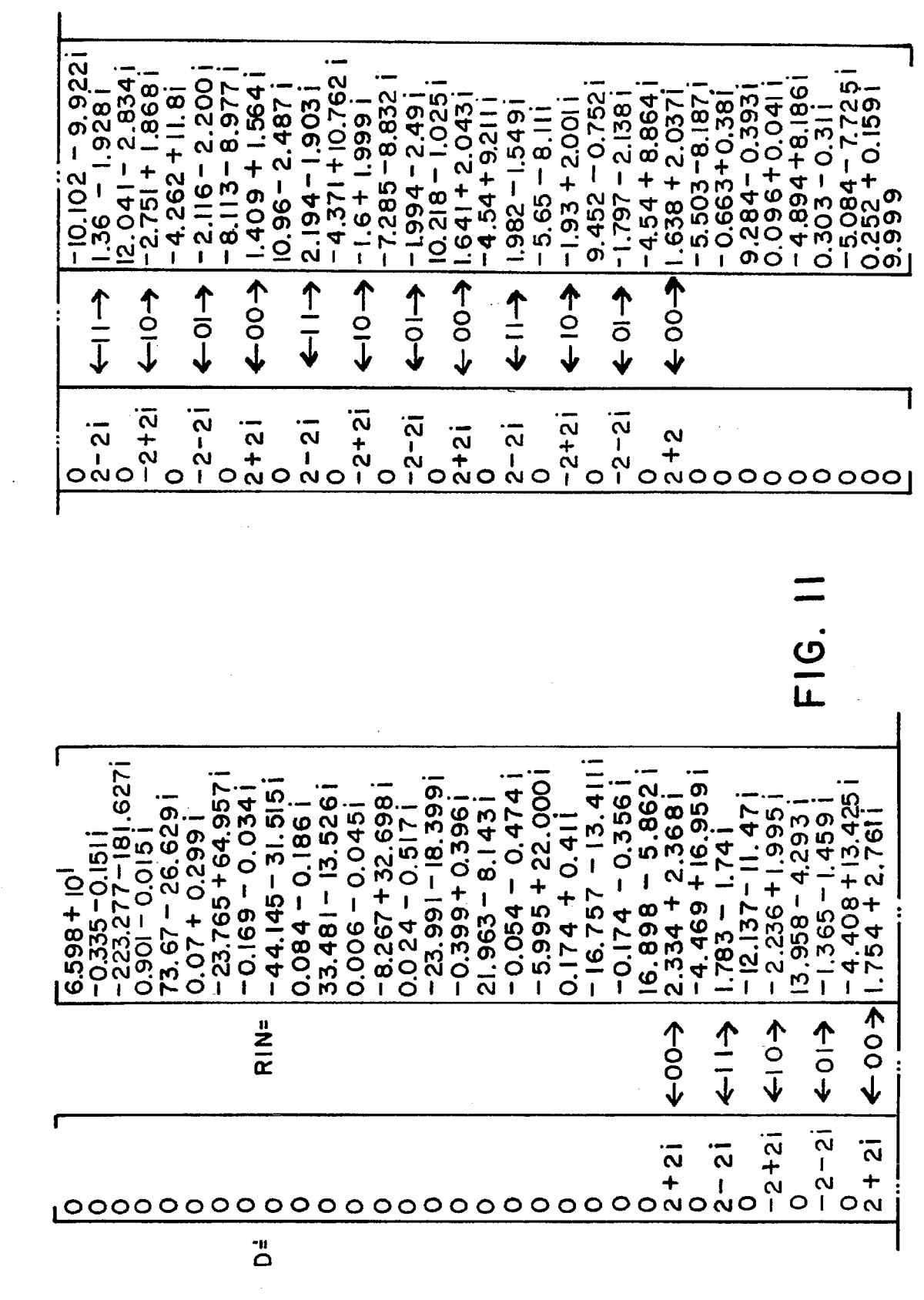

FIG. 11 shows vector R. Recall from the original signal vector D that the odd numbered elements starting from element 23 through element 55 were set to the values of the data. Comparison of vectors D and R shows that in vector R the odd elements starting with element 23 are the values of the data changed by AWGN, yet detectable using the well-known maximum likelihood principle.

Figure 12:
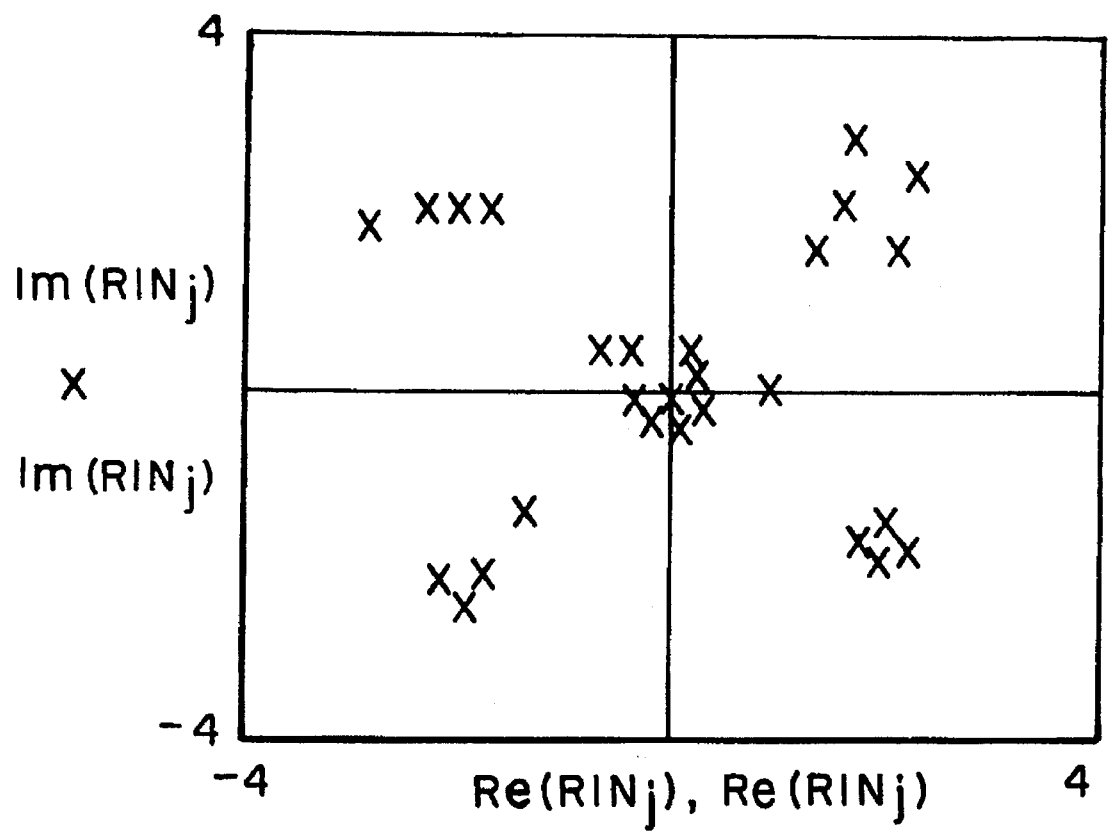
FIG. 12 shows a QAM constellation mapping of demodulated vector R of FIG. 11.

FIG. 12 shows a QAM mapping of the demodulated vector R. Note that the 17 intended QAM signals in transmitted vector s(t) were located at (+2+2i) and appear in the received vector R in their corresponding respective quadrants, but slightly displaced from their transmitted positions by AWGN. The cluster of points around (0,0) are from the sub-carrier frequencies below 4 kHz and above 10 kHz which were chosen not to be used and were left as (0,0). The points representing the substation interference are located beyond the displayed limits of the FIG. 12. It should be emphasized that it is the orthogonality of the sub-channels with respect to the power substation interference which ensures separation of the intended communication signal from the interference.

Vector R shows that FFT transformation completely separates the communication signal from substation interference even though in the time representation of FIG. 10B the communication signal seems to be submerged within the interference. As long as the receiver is synchronized with the transmitter, each epoch is demodulated and the information in the transmitted communication signal is received.

The above example illustrates how sub-carrier frequencies are selected to avoid the harmonic interference generated by the power system. Interference caused by a train propulsion system can be detected and avoided through the same technique. This example also shows that even though the received signal contains harmonic interference having an amplitude several times greater than that of the communication signal, it is possible to extract the desired signal through the prescribed demodulation process as long as the interference is within the dynamic range of the input of the analog-to-digital converter of the receiver.

In the previous example, several design parameters were chosen. Selection requirements for these parameters, along with several other design requirements, are now considered.

The width of each sub-channel, or sub-band, $\Delta f$, was selected to be 180 Hz. This also happens to be the same as the frequency separation between the consecutive sub-carrier frequencies. It is required that the ratio of separation between consecutive interference harmonics (360 Hz in the example) to $\Delta f$, the width of each sub-channel, be an integer greater than or equal to 2. Also, the period T of an epoch and the width of a sub-channel are reciprocals of each other, that is, $T=1/\Delta f$.

Ignoring interference for a moment, if the width of the sub-channel is reduced to half, i.e., from 180 Hz to 90 Hz, then the length of the epoch period T must be correspondingly doubled. In that case, the number of sub-channels will also be doubled from 64 to 128. So, while it appears that the number of sub-channels increase, the epoch time also increases in the same ratio, yielding no apparent gain in the overall data rate. However, it should be kept in mind that this is when no interference is present.

When harmonic interference is considered, as in mass transit signaling, increasing the number of sub-carrier frequencies provides an advantage. The ratio of the number of useful sub-carrier frequencies to the number of interfered with frequencies improves, and spectrum usage and data rate are improved. That is, when harmonic interference is considered with respect to the non-interference case, the number of potential sub-carrier frequencies available for signaling are reduced by the interference. By increasing the number of sub-channels, more potential sub-carriers frequencies are available for signaling, while those sub-carrier frequencies corrupted by interference remains the same.

It should be noted that in the modulation technique according to the present invention the sub-carrier frequencies are keyed with the data without any prefiltering. The spectrum of the resulting signal having an input of a rectangular pulse p (t)=1/T for 0<t<T, and 0 elsewhere, for the nth sub-channel is $$Qn(f) = \text{sinc}\left[\frac{f-f_{c,n}}{\Delta f}\right] \quad (4)$$

where, $\Delta f$ is the separation between the consecutive sub-carrier frequencies, and $F_{c,n}$ is the nth carrier frequency. Since the sub-carrier frequencies are spaced $\Delta f$ apart, the spectrum of a particular sub-carrier keyed with data is zero at the center of each of the other sub-channels including the sub-channels with the interfering harmonics, and vice versa.

If the signal with a spectrum given by equation (4) is demodulated by cos $2\pi f_{c,n} t$, then the original baseband signal, p(t) is recovered. If, however, it is demodulated into another sub-channel which is offset by m$\Delta f$, then the baseband signal that may cause interchannel interference (ICI) is $$Pm(t) = \int_{-\infty}^{+\infty} \frac{\sin\pi(f-m\Delta f)T}{\pi(f-m\Delta f)T} \exp(j2\pi ft) df \quad (5)$$

$$= p(t) \exp(j2\pi m\Delta ft) \quad (6)$$

Thus, ICI appears in both the in-phase and the quadrature channels of the other sub-channels as a burst having a duration T of sine (or cosine) waves of the offset frequency. The detection technique used in the receiver is equivalent to integrating this signal equation (5) from O to T. Because of the spacings of the sub-carriers, this integral is zero for all values of m. Thus, at least for undistorted channels, orthogonality between sub-channels is ensured. For minimizing ICI from the sub-channels containing interference, the interference harmonics must remain at the center of their respective sub-channel. This is accomplished by synchronizing the transmitter and receiver with harmonics of the substation interference.

The main effect of channel distortion is to disturb the integration of $P_m$ (t) in equation (5) such that the contribution terms no longer cancel each other exactly, thus resulting in ICI. A basic method of remedying this is to postpone the integration in equation (5) for a time $T_g$, that is, the guard period previously discussed. The total symbol time, $T_{sym}$, is thus increased to $T_{sym}=T+T_g$, while still retaining the relationship $T=\Delta f$. $T_g$ usually represents a small fraction of the total symbol time $T_{sym}$. The guard period is an overhead which tends to reduce the overall efficiency of signaling and should be chosen to be as minimum as possible for ensuring ICI below an acceptable level.

Another method of dealing with effects of channel distortions is equalization. Channel distortion parameters are determined by sending a reference "comb" of unmodulated sub-carriers from the transmitter to the receiver. The receiver then can compensate subsequently received communication signals based on the received reference comb.

The number of bits per sub-channel was chosen to be 2 in the previous example. This can be increased or decreased based on the general level of AWGN in the sub-channel. The lower the AWGN, the greater the number of bits that can be encoded in the sub-channel.

Synchronization between the transmitter and the receiver requires two levels of synchronization, clock synchronization and epoch synchronization. For clock synchronization, the sampling clock of the receiver must be synchronized to the transmitter digital-to-analog converter clock. For epoch synchronization, the receiver must have clear indication of the beginning and the end of an epoch for ensuring proper sampling alignment.

Clock synchronization according to the present invention can be accomplishing in one of two ways. First, the interference, which is always present and available to both the transmitter and the receiver, can be used as a synchronization reference. Another way would be to use an independent tone, say 10 kHz, which is transmitted by the transmitter and used by the transmitter and receiver for synchronization. In either case, both the transmitter and receiver clocks should operate at greater than twice the highest sub-carrier frequency within the communication signal (23,040 Hz for the earlier example) and be synchronized in both frequency and phase.

Figure 13:
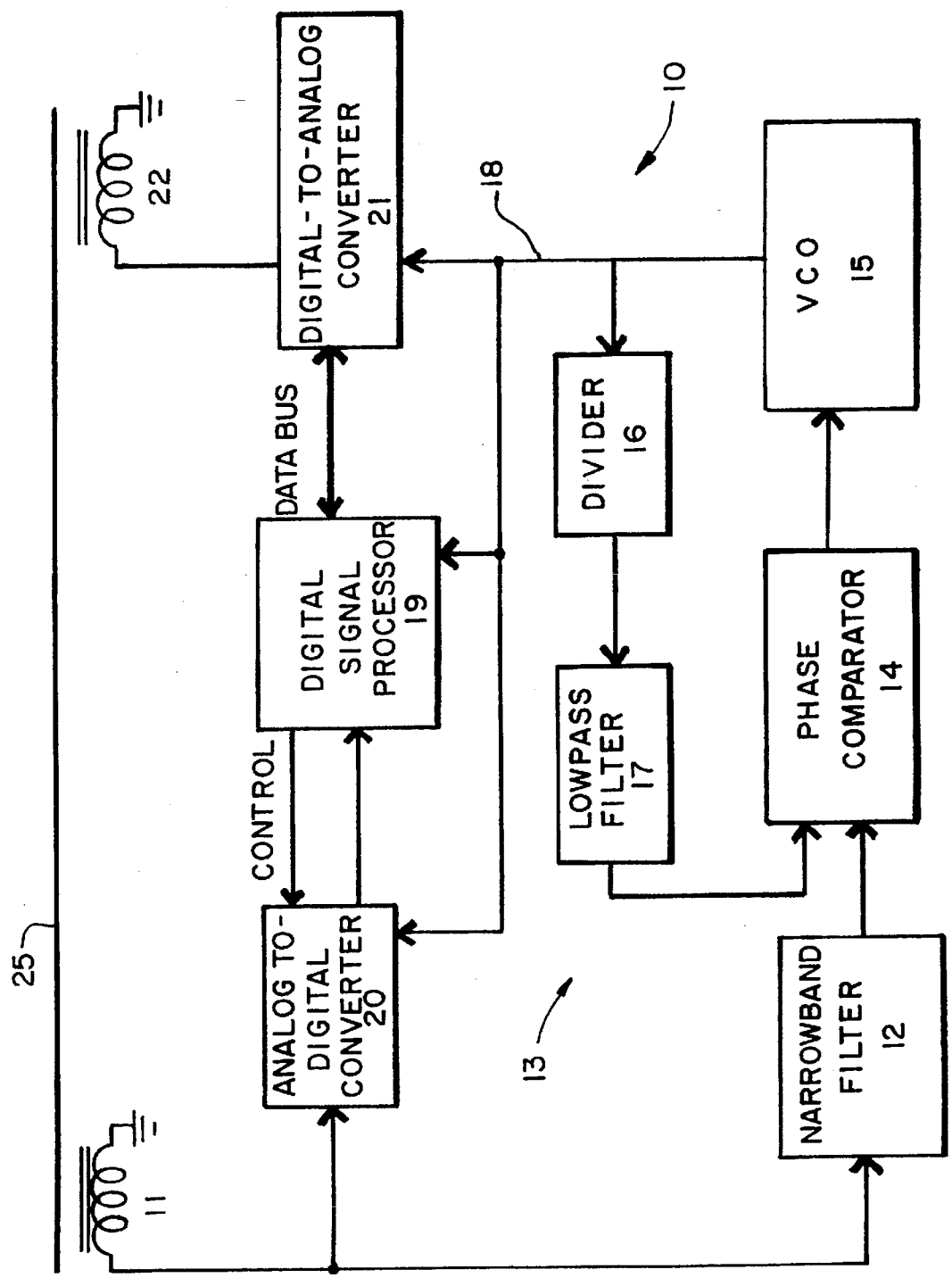
FIG. 13 shows schematic block diagram of a transmitter according to the present invention.
Figure 14:
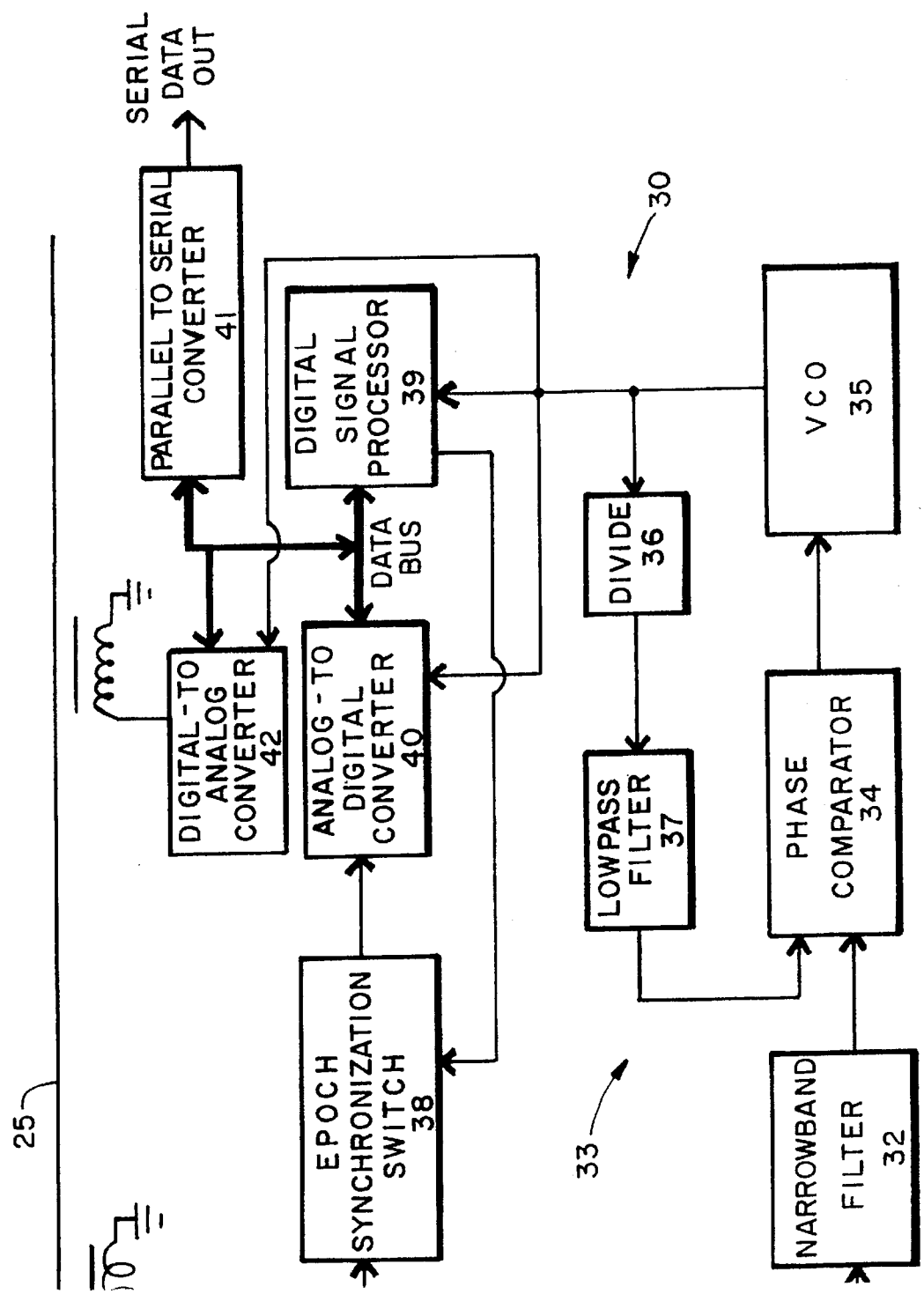
FIG. 14 shows a schematic block diagram of a receiver according to the present invention.

FIG. 13 shows a schematic block diagram of a transmitter 10, according to the present invention, which includes a clock synchronization circuit using the fundamental frequency of the substation interference. FIG. 14 shows a schematic block diagram of a receiver 30. The receiver 30 includes a clock synchronization circuit which operates similar to the clock synchronization circuit of transmitter 10. In FIGS. 13 and 14, both the transmitter and receiver are synchronized to the fundamental of the harmonic interference, which has been previously assumed to be 360 Hz. A harmonic could also be chosen without significant change in the respective synchronizing circuits. Implementation with an independent tone, such as 10 kHz, would be similar.

In FIG. 13, the fundamental of the substation interference at 360 Hz, for example, is received from inductive line 25 by inductive sensor 11 and filtered by narrowband filter 12. The filtered fundamental output from filter 12 is then used to drive phase-locked loop (PLL) 13. PLL 13 includes phase comparator 14, voltage controlled oscillator (VCO) 15, divider 16, and lowpass filter 17. The filtered fundamental output from filter 12 is applied to one input of phase comparator 14. The output of phase comparator 14 is applied to VCO 16 which, in response, generates a square wave synchronization signal 18 that is coupled to divider 16, digital signal processor 19, ADC 20 and DAC 21. Divider 16, in this example, divides synchronization signal 18 by 64. The output of divider 16 passes through lowpass filter 17 and is applied to a second input to phase comparator 14. Phase comparator 14 adjusts the VCO 15 output so that the sampling rate is exactly 64 times the 360 Hz tone. The edges, or zero-crossings, of synchronization signal 18 are locked to those of the 360 Hz tone. Note that if the period of the interference signal changes somewhat, both, the transmitter 10 and the receiver 30 adapt accordingly, ensuring orthogonality between the communication signal and the interference. When Clock synchronization is based on the fundamental of the interference, the sub-carrier frequencies constantly maintain the same separation from the interfering harmonics. When an independent tone (such as 10 kHz) is used, care must be taken to maintain the same separation between the interfering harmonics and the carrier frequencies.

Inductive sensor 11 also couples the substation harmonic interference to ADC 20. ADC 20 samples the substation interference under control of synchronization signal 18. The digitized interference signal is then coupled to processor 19 where a fast Fourier transform is performed on the interference samples for analyzing the spectrum of the substation interference, as was done at the beginning of the earlier example. Sub-channels are selected or omitted for the communication signal based upon the detected interference harmonics. Processor 19 then generates a D vector based on the detected interference conditions and using a previously selected QAM constellation convention. Processor 19 performs an inverse fast Fourier transform on vector D for generating an s vector, which is subsequently coupled to DAC 21 for producing the CW signal. The CW signal is coupled to transmitting loop 22 for transmission over inductive line 25 to a receiver 30.

Processor 19 can be embodied by any suitable microprocessor having sufficient speed and computing power for performing FFTs and IFFTs. If processor 19 is embodied as a microprocessor, processor 19 will also include any necessary support circuitry such as memory, registers, address decoders, oscillators, etc. Processor 19 can also be embodied by well-known dedicated logic circuits or by an application specific integrated circuit (ASIC). Both ADC 20 and DAC 21 can be embodied by readily available dedicated integrated circuits having sufficient speed and bit resolution for a particular signaling application. ADC 20 needs to having an input dynamic range sufficient for accommodating the harmonic interference coupled to its input. Narrowband filter 12, phase comparator 14, VCO 15, divider 17 and low pass filter 17 all can be embodied by readily available standard components. Processor 19 can be coupled to divider 16 for varying the divisor of divider 16 depending upon the number of samples selected for an FFT/IFFT.

In FIG. 14, the received signal is received from inductive line 25 by inductive sensor 31 and is coupled to epoch synchronization switch 38 and to narrowband filter 32. Receiver 30 includes PLL 33 having phase comparator 34, VCO 35, divider 36 and lowpass filter 37. PLL 33 operates similar to PLL 13 of transmitter 10 and will not be discussed in detail. The components of PLL 33 are embodied by readily available standard components.

The received signal is also coupled to switch 38 which is controlled by processor 39 for epoch synchronization. Unlike clock synchronization, epoch synchronization must depend on the particular application of the multi-carrier modulation system according to the invention. For example, epoch synchronization for a simplex communication system, e.g., for transmitting speed codes from wayside to a vehicle, does not have any feedback information available from the receiver for "hand shaking". Hence, the transmission signal must include a start/stop marker for each epoch and the receiver must be able to detect the start/stop marker so that sampling of the epoch is aligned accurately. In a half-duplex or a full-duplex system, the feedback information from the receiver is used in a well-known manner for hand-shaking as well as alignment of epoch sampling. In duplex systems, a start/stop marker for every epoch is not required.

In FIG. 14, the received communication signal is coupled through epoch synchronization switch 38 to ADC 40 for sampling, thus forming sampled vector SNI. An inverse FFT transform is then performed on this sampled signal by digital signal processor 39 to form vector D. The transmitted data is then recovered using the QAM constellation convention employed in the particular signaling application. The data is then coupled to parallel to serial converter 41 for use elsewhere in the receiver or can be acted upon by processor 39. For simplex operation, the data is received only, no data is transmitted from receiver 30 to transmitter 10. For duplex operation, receiver 30 includes DAC 42 for producing a CW waveform for transmission. In this situation, receiver 30 operates similar to transmitter 10 in sampling the interference and producing the CW waveform, as previously described in connection with transmitter 10.

Processor 39 can be embodied by any suitable microprocessor having sufficient speed and computing power for performing FFTs and IFFTs. Processor 39 can also be embodied by suitable dedicated logic circuits or by an ASIC. ADC 40 and DAC 42 can be embodied by readily available integrated circuits which are suitable.

Both processors 19 and 39 can perform adaptive signaling by selecting or omitting particular sub-carrier frequencies, depending on detected interference harmonics. Particular sub-carriers being used can be indicated within the data transmitted in the communication signal. When an AF communication system is configured for half-duplex or duplex operation, a transmitter/receiver unit will include both the constituent components of the transmitter of FIG. 13 and the receiver of FIG. 14.

Those skilled in the art, having the benefit of the teachings of the present invention as set forth above, can effect numerous modifications thereto. Those modifications are to be construed as being encompassed within the scope of the present invention as set forth in the appended claims.

What is claimed is:

1. A method for communicating between a wayside and a vehicle over a track circuit, the method comprising the steps of:

sampling a first time series signal on the track circuit, the first time series signal including a first communication signal and a first interference signal;

fast Fourier transforming the sampled first time series signal;

detecting first vector signals in a first plurality of sub-carrier frequencies related to the first communication signal, the first plurality of sub-carrier frequencies being unrelated to the first interference signal;

sampling a second interference signal on the track circuit between the sampling of the first time series signal and the sampling of a second time series signal;

fast Fourier transforming the sampled second interference signal;

detecting interference in at least one of the first plurality of sub-carrier frequencies;

sampling the second time series signal on the track circuit, the second time series signal including a second communication signal and the second interference signal;

fast Fourier transforming the sampled second time series signal; and detecting second vector signals in a second plurality of sub-carrier frequencies related to the second communication signal wherein the second plurality of sub-carrier frequencies is unrelated to the second interference signal and wherein at least one sub-carrier frequency is different between the second plurality of sub-carrier frequencies and the first plurality of sub-carrier frequencies.

2. The method according to claim 1 further including the steps of:

forming the first vector signals corresponding to the first plurality of sub-carrier frequencies;

inverse fast Fourier transforming the first vector signals to produce the first communication signal;

coupling the first communication signal to the track circuit, the track circuit including the first interference signal;

sampling the second interference signal on the track circuit between the coupling of the first communication signal to the track circuit and the coupling of the second communication signal to the track circuit;

fast Fourier transforming the second interference signal;

detecting interference in at least one of the first plurality of sub-carrier frequencies;

forming the second vector signals corresponding to the second plurality of sub-carrier frequencies;

inverse fast Fourier transforming the second vector signals to produce the second communication signal; and coupling the second communication signal to the track circuit, the track circuit including the second interference signal.

3. The method according to claim 2 further including the step of synchronizing the coupling of the first communication signal and the second communication signal to the track circuit based on one of an independent tone and a fundamental frequency of one of the first interference signal and the second interference signal.

4. The method according to claim 1 further including the step of synchronizing the sampling of the first time series signal and the second time series signal from the track circuit based on one of an independent tone and a fundamental frequency of one of the first interference signal and the second interference signal.

5. A method for transmitting communication signals over a track circuit and between a wayside and a vehicle, the method comprising the steps of:

forming first vector signals at a transmitter corresponding to a first plurality of sub-carrier frequencies, the first plurality of sub-carrier frequencies being related to a predetermined sampling frequency;

inverse fast Fourier transforming the first vector signals at the transmitter to form a first communication signal;

coupling the first communication signal from the transmitter to the track circuit;

sampling an interference signal on the track circuit at the transmitter at the predetermined sampling frequency to produce a transmitter sampled interference signal, the transmitter sampled interference signal being sampled between the coupling of the first communication signal and the coupling of a second communication signal to the track circuit;

fast Fourier transforming the transmitter sampled interference signal;

detecting interference in at least one of the first plurality of sub-carrier frequencies;

forming second vector signals at the transmitter corresponding to a second plurality of sub-carrier frequencies wherein the second plurality of sub-carrier frequencies are related to the predetermined sampling frequency and wherein at least one sub-carrier frequency is different between the first plurality of sub-carrier frequencies and the second plurality of sub-carrier frequencies;

inverse fast Fourier transforming the second plurality of vector signals at the transmitter to form a second communication signal, the second communication signal being orthogonal to the detected interference; and coupling the second communication signal from the transmitter to the track circuit.

6. The method according to claim 5 further including the steps of:

sampling the first communication signal on the track circuit at a receiver at the predetermined sampling frequency;

fast Fourier transforming the first communication signal at the receiver to recover the first plurality of sub-carrier frequencies containing the first vector signals;

sampling the interference signal on the track circuit at the receiver at the predetermined sampling frequency to produce a receiver sampled interference signal, the receiver sampled interference signal being sampled between the sampling of the first time series communication signal and the sampling of the second time series communication signal;

fast Fourier transforming the receiver sampled interference signal;

detecting the interference in the at least one of the first plurality of sub-carrier frequencies;

sampling the second communication signal on the track circuit at the receiver at the predetermined sampling frequency; and fast Fourier transforming the second communication signal at the receiver to recover the second plurality of sub-carrier frequencies containing the second vector signals.

7. The method according to claim 6 further including the steps of:

synchronizing the coupling of the first time series communication signal and the second time series communication signal to the track circuit based on one of a fundamental frequency of the interference signal and an independent tone; and synchronizing the sampling of the first time series communication signal and the second time series communication signal from the track circuit based on one of the fundamental frequency of the interference signal and the independent tone.

8. The method according to claim 7 wherein the tone is transmitted by one of the transmitter and the receiver.

9. The method according to claim 6 wherein the transmitter is located at one of the vehicle and the wayside and wherein the receiver is located at the other of the vehicle and the wayside.

10. A method for communicating between a wayside and a vehicle over a track circuit utilizing one of quadrature amplitude modulation and quadrature amplitude shift keying modulation, the method comprising the steps of:

transforming first vector signals to a first time series communication signal at a transmitter, the first time series communication signal being orthogonal to a first interference signal on the track circuit;

coupling the first time series communication signal from the transmitter to the track circuit;

sampling the first time series communication signal on the track circuit by a receiver;

inverse transforming the first time series communication signal to recover the first vector signals, the inverse transforming being based on the orthogonality of the first time series communication signal and the first interference signal;

detecting by the transmitter and by the receiver a change in interference on the track circuit from the first interference signal to a second interference signal, the second interference signal lacking orthogonality with the first time series communication signal; and adapting the transmitter and the receiver so that the transmitter transforms second vector signals to a second time series communication signal that is orthogonal to the second interference signal and the receiver inverse transforms the second time series communication signals to recover the second vector signals, the inverse transforming being based on the orthogonality of the second time series communication signal and the second interference signal.

11. The method according to claim 10 further including the steps of:

coupling the second time series communication signal from the transmitter to the track circuit; and sampling the second time series communication signal on the track circuit by the receiver.

12. The method according to claim 10, wherein the transmitter and receiver independently detect the change in interference from the first interference signal to the second interference signal.

13. The method according to claim 12, wherein the transmitter and receiver adapt independent of each other.

14. The method according to claim 10, wherein one or both of the first interference signal and the second interference signal includes a power system interference signal.

15. The method according to claim 10, wherein one or both of the first interference signal and the second interference signal includes a propulsion system interference signal.

16. The method according to claim 10, wherein the coupling and sampling of time series communication signals to and from the track circuit are synchronized in frequency and phase.

17. A system for communicating between a wayside and a vehicle over a track circuit, the track circuit having an interference signal, the system comprising:

a transmitter including,
a first sensor coupled to the track circuit for sensing interference signals;
a first sampling circuit, coupled to the first sensor, for sampling the interference signals to produce transmitter sampled interference signals; and
a first signal processor, coupled to the first sampling circuit, for forming a first vector signal corresponding to a first sub-carrier frequency that is orthogonal to a first sampled interference signal and for performing an inverse fast Fourier transformation on the first vector signal to form a first time series communication signal which is coupled to the track circuit, the first signal processor detecting a second sampled interference signal lacking orthogonality with the first sub-carrier frequency, the first signal processor further forming a second vector signal corresponding to a second sub-carrier frequency, the second sub-carrier frequency being different from the first sub-carrier frequency and being orthogonal to the second interference signal, the first signal processor performing an inverse fast Fourier transformation on the second vector signal to form a second time series communication signal which is coupled to the track circuit; and a receiver comprising,
a second sensor coupled to the track circuit for sensing the interference signals and for receiving the time series communication signals;
a second sampling circuit, coupled to the second sensor, for sampling the interference signals and for sampling the received time series communication signals to produce receiver sampled interference signals and receiver sampled time series communication signals; and
a second signal processor, coupled to the second sampling circuit, for fast Fourier transforming the receiver sampled first time series communication signal to recover the first vector signal, the second signal processor detecting the second interference signal lacking orthogonality with the first sub-carrier frequency, the second signal processor fast Fourier transforming the receiver sampled second time series communication signal to recover the second vector signal.

18. The system according to claim 17, wherein the transmitter further comprises a first synchronizing circuit coupled to the track circuit for synchronizing the coupling of the time series communication signal to the track circuit based on one of an independent tone and a fundamental frequency of the interference signal, and wherein the receiver further comprises a second synchronizing circuit coupled to the track circuit for synchronizing the sampling of the time series communication signal from the track circuit based on the one of the independent tone and the fundamental frequency of the interference signal.

19. The system according to claim 17, wherein the first signal processor forms the second vector signal by keying the second sub-carrier frequency with a data signal using quadrature amplitude modulation.

20. The system according to claim 17, wherein the first signal processor forms the second vector signal by keying the second sub-carrier frequency with a data signal using quadrature amplitude shift keying modulation.

21. The system according to claim 17, wherein at least one of the first interference signal and the second interference signal includes a power system interference signal.

22. The system according to claim 21, wherein at least one of the first interference signal and the second interference signal includes a propulsion interference signal.

23. The system according to claim 17, wherein the coupling of the time series communication signals to the track circuit and the sampling of the time series communication signals are synchronized in frequency and phase.

* * * * *

UNITED STATES PATENT AND TRADEMARK OFFICE
CERTIFICATE OF CORRECTION

PATENT NO. : 5,666,382
DATED : September 9, 1997
INVENTOR(S) : Prashant B. Thakore It is certified that error appears in the above-identified patent and that said Letters Patent is hereby corrected as shown below:

Column 1 Line 30 "modulation,techniques" should read --modulation techniques--.

Column 5 Line 44 after "from the track" insert --circuit--.

Column 8 Line 31 "six-purse" should read --six-pulse--.

Column 9 Line 14 after "frequencies above 10" insert --kHz may require FCC licensing, so the 9 sub-carrier--.

Column 9 Line 62 "$T_{epoch=}$" should read --$T_{epoch} =$--.

Column 10 Line 42 "(signal+ noise" should read --(signal + noise--.

Column 10 Line 65 "(+2 +2i)" should read --($\pm 2 \pm 2i$)--.

Column 12, Esq. (5), Lines 15-20 "$\int_{-\infty}^{+\infty}$" should read --$\int_{-\infty}^{+\infty}$--.

Signed and Sealed this

Sixth Day of January, 1998

Attest:

BRUCE LEHMAN

*Attesting Officer*     *Commissioner of Patents and Trademarks*